United States Patent [19]

Terao et al.

[11] Patent Number: 4,769,311

[45] Date of Patent: * Sep. 6, 1988

[54] INFORMATION RECORDING MEMBER

[75] Inventors: Motoyasu Terao, Hinodemachi; Yasushi Miyauchi, Hachioji; Kazuo Shigematsu, Saitama; Shinkichi Horigome, Tachikawa, all of Japan

[73] Assignee: Hitachi, Ltd., Tokyo, Japan

[*] Notice: The portion of the term of this patent subsequent to Jan. 20, 2004 has been disclaimed.

[21] Appl. No.: 884,228

[22] Filed: Jul. 10, 1986

Related U.S. Application Data

[62] Division of Ser. No. 642,260, Aug. 20, 1984, Pat. No. 4,637,976.

[30] Foreign Application Priority Data

Aug. 19, 1983 [JP] Japan ................. 58-150148

[51] Int. Cl.$^4$ ................. G03C 1/72; G03C 5/00
[52] U.S. Cl. ................. 430/348; 430/495; 430/945; 430/964
[58] Field of Search ............ 430/964, 945, 495, 523, 430/346, 348; 346/135.1

[56] References Cited

U.S. PATENT DOCUMENTS

| | | | |
|---|---|---|---|
| 3,990,084 | 11/1976 | Homisch et al. | 430/495 |
| 4,238,803 | 12/1980 | Terao et al. | 430/945 |
| 4,278,734 | 7/1981 | Ohta et al. | 430/495 |
| 4,286,045 | 8/1981 | Nahata et al. | 430/495 |
| 4,290,075 | 9/1981 | Jacobs et al. | 430/270 |
| 4,348,461 | 9/1982 | Terao et al. | 428/409 |
| 4,385,305 | 5/1983 | Terao et al. | 430/964 |
| 4,476,214 | 10/1984 | Zalm et al. | 430/495 |

Primary Examiner—Richard L. Schilling
Attorney, Agent, or Firm—Antonelli, Terry & Wands

[57] ABSTRACT

In a data recording member having a data recording film which is formed on a substrate either directly or via at least one of inorganic and organic protective layers and which causes the change of atomic arrangement upon being irradiated by recording beam, the improvement wherein said data recording film has an average composition in a direction of the film thickness expressed by the following formulas:

$$M_xTe_ySe_zO_\alpha$$

wherein x, y, z and α are values within the ranges of $2 \leq x \leq 40$, $30 \leq y \leq 95$, $3 \leq z \leq 45$, $0 \leq \alpha \leq 20$, and M is at least one element selected from the group consisting of As, Sb, Bi, S, Si, Ge, Sn, Pb, Al, Ga, In, Tl, Zn, Cd, Au, Ag, Cu, Ni, Pd, Rh, Cr, Mo, W and Ta.

7 Claims, 1 Drawing Sheet

INFORMATION RECORDING MEMBER

This is a division of application Ser. No. 642,260, field Aug. 20, 1984, now U.S. Pat. No. 4,637,976.

BACKGROUND OF THE INVENTION

This invention relates to an information recording member which makes it possible to record on a real time basis frequency-modulated analog signals such as video and audio signals or digital data such as computer data, facsimile signals, digital audio signals, and the like, on an information recording film formed on a predetermined substrate, using a recording beam such as laser light.

Various principles exist for recording information on a film using laser light. Among them, information recording based upon the change of atomic arrangement such as the phase transition (or phase change) of a film material, photodarkening, and the like, has the advantage that two discs can be directly bonded to form a two surface disc because deformation of the film hardly occurs. Moreover, rewrite of the information can also be made by selecting a suitable composition. A large number of inventions relating to the recording of this kind are known, and the earliest of all is disclosed in U.S. Pat. No. 3,530,441. This prior art reference discloses a large number of films such as a Te-Ge film, an As-Te-Ge film, a Te-O film, and so forth. Japanese Patent Laid-Open No. 28530/1980 discloses Te-O-Se and Te-O-S films. However, it is extremely difficult to produce the films using these materials, and stability under the amorphous state is not sufficiently high.

SUMMARY OF THE INVENTION

It is, therefore, an object of the present invention to provide an improved information (data) recording member.

It is another object of the present invention to provide a data recording member which has high reproducibility in the production process thereof and which remains stable for an extended period of time.

In an information recording member having an information recording film which is formed on a substrate either directly or via at least one of an inorganic protective layer and an organic protective layer and which causes the charge of atomic arrangement upon irradiation of recording beam, the objects of the present invention described above can be accomplished by an information recording member characterized in that the information recording film has an average composition, in a direction of the film thickness (i.e., perpendicular to the surface) expressed by the following formula:

$$M_xTe_ySe_zO_\alpha$$

wherein x, y, z and $\alpha$ are values within the ranges of $2 \leq x \leq 40$, $30 \leq y \leq 95$, $3 \leq z \leq 45$ and $0 \leq \alpha \leq 20$, and M is at least one element selected from the group consisting of As, Sb, Bi, S, Si, Ge, Sn, Pb, Al, Ga, In, Tl, Zn, Cd, Au, Ag, Cu, Ni, Pd, Rh, Cr, Mo, W and Ta.

DESCRIPTION OF THE PREFERRED EMBODIMENTS

Figure 1:
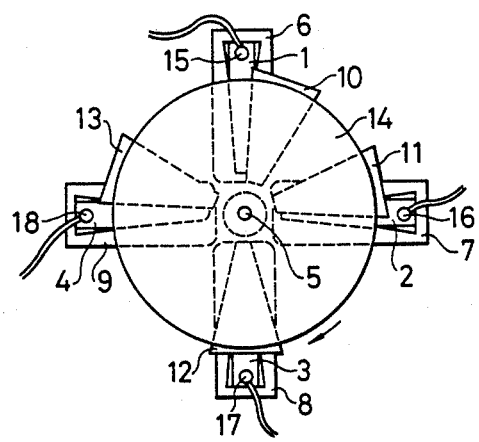
FIG. 1 is a schematic view showing the internal structure of a vacuum evaporator used for producing a data recording member of the present invention.

Among the elements represented or expressed by M, at least one of Sn and In are preferred and of these, Sn is particularly preferred because it enhances the stability under the amorphous state. However, the film can be formed more easily in In than Sn. Sb is the next preferable element. The element which provides this effect when used in combination with at least one of Sn, In and Sb is at least one element selected from the group consisting of Ge, Si, Bi, S, Pb, Al, Zn, Cd, As, Au, Ag, Cu, Ni and Pd. Among them, one of Bi and Pb is particularly preferable.

In the data recording film of the present invention, the oxygen-containing film is preferably produced by first forming a film which does not contain oxygen and is expressed by the formula 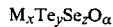, and then heat-treating this film in air of high humidity or radiating ultraviolet rays to the film. In this case, the film is oxidized at least near its surface, and oxygen comes into the film at times. Accordingly, the average composition of the film in the direction of its thickness is expressed by the general formula $M_xTe_ySe_zO_\alpha$, where $\alpha$ is not zero (0) but is a value below 20. If oxygen is introduced by such a method, the composition can be controlled more easily than by evaporation of oxide or by sputtering.

The properties can be improved in many cases if at least two elements represented by M co-exist. Examples of the combination that can be used include In and Sb, Sn and Ge, Pb and Sn, Sn and Bi, Sn and S, In and Pb, In and Bi, Sb and Bi, Sb and S, Sb and Pb, Sb and Sn, Sb and Ge, As and Sn, and As and Sb. Among them, the combinations of Sn with other elements are preferable.

The distribution, in the direction of film thickness, of the content of the element expressed by M may be arbitrary, but it is preferred that the content increases at either one of the surface portions (which might be an interface with other layers at times) of the recording film than the inside of the film, because spontaneous crystallization from near the film surface at which nuclei of micro-crystals are likely to develop, can be prevented. For the same reason as described above, the distribution in the direction of film thickness, of the content of Se may be arbitrary, but the content preferably increases near the surface (interface). Incidentally, the film may contain trace amounts of elements other than those expressed by M.

The films, which hardly contain oxygen, can be easily formed, have high crystallization temperatures and provide high stability.

Preferably, at least one of the surfaces of the recording film of the present invention is protected by another material which is in close contact with that surface. The protective layer may consist of an acrylic resin sheet or a polycarbonate resin sheet which is the substrate, or at least one of organic materials such as ultraviolet light cured resins, epoxy resins, acrylic resins, polyester resins, or the like. The protective layer may also consist of at least one of inorganic materials, such as oxides, sulfides, fluorides, carbides, nitrides, or carbon. The substrate which consists of glass, quartz or sapphire, can serve as one of the inorganic protective layers. From the aspect of heat resistance, the surface of the recording film is preferably in close contact with the inorganic material. However, if the thickness of the inorganic layer is increased, crack and drop of transmissivity and sensitivity are likely to occur. It is, therefore, preferable that a thick organic layer is disposed in close contact with the inorganic layer on the opposite side to the recording film. The organic layer may be the substrate, and in such a case, deformation of the recording film becomes difficult to occur. Examples of the organic materials are polystyrene resins, acrylic resins, polycarbonate resins, epoxy resins, ethylene-vinyl acetate copolymers known as hot melt adhesives, binders, and the like. Ultraviolet-cured resins may also be used.

The protective layers consisting of the inorganic materials can be formed in their final compositions, but can be formed more easily by first forming a film made of at least one member selected from the group consisting of a metal, a semi-metal or a semiconductor, and then making the film react with at least one of O, S and N. Examples of the inorganic protective layer include those whose principal or major components have the composition analogous to $CeO_2$, $La_2O_3$, SiO, $SiO_2$, $In_2O_3$, $Al_2O_3$, GeO, $GeO_2$, PbO, SnO, $SnO_2$, $Bi_2O_3$, $TeO_2$, $WO_2$, $WO_3$, CdS, ZnS, CdSe, ZnSe, $In_2S_3$, $In_2Se_3$, $Sb_2S_3$, $Sb_2Se_3$, $Ga_2Se_3$, $MgF_2$, $CeF_2$, GeS, GeSe, $GeSe_2$, SnS, SnSe, PbS, PbSe, $Bi_2Se_3$, $Bi_2S_3$, TaN and C.

Among them, the compositions comprising $GeO_2$ or $Al_2O_3$ are preferable because vacuum evaporation is easy, surface reflectivity is not much high and the film is stable. Next preferred are compositions which consist essentially of $SiO_2$. It will be appreciated that $GeO_2$ and $Al_2O_3$ formed by vacuum evaporation are nonstoichiometric materials. When recording is effected by means of the phase transition, it is preferred that the entire surface of the recording film be crystallized in advance. When the organic material is used for the substrate, however, the substrate can not be heated to a high temperature, so that the film surface must be crystallized by other methods. In such a case, the combination of ultraviolet light radiation with heating, radiation of the light from a flash lamp, or the like, is preferably conducted. Crystallization may be generated only on the recording track with the spacings between the tracks kept amorphous. It is, of course, possible to make recording on a recording film under the amorphous state by crystallization.

Generally, in the case of recording films which make recording by means of the change of atomic arrangement such as the phase transition, the read signal intensity or the degree of modulation can be improved if a light reflection (absorption) layer is disposed close to the recording film. If data rewriting is effected a large number of times or if recording is made using a beam having excessively high power, however, mutual diffusion and reaction will occur between the recording film and the light reflection layer. For this reason, it is preferred to dispose an intermediate layer consisting of at least one stable member selected from the group consisting of an oxide, a sulfide, a fluoride or a nitride between the light reflection layer and the recording film. The melting point and boiling (sublimation) point of this layer are preferably higher than at least the melting point of the recording film. Where the light absorption by the recording film is less, the light reflection layer absorbs the light and the resulting heat is transmitted to the recording film so as to make recording, the intermediate layer described above is preferably up to 100 nm (0.1 $\mu$m) thick, and particularly preferably from 1 nm to 50 nm thick, in order to improve the heat transfer efficiency. The inorganic materials such as $GeO_2$, $Al_2O_3$, and the like that can be used as the protective layer, can all be used as the intermediate layer.

The preferred ranges of thickness of the layers described above are tabulated below:
recording film: 3 nm to 300 nm
inorganic protective layer: 1 nm to 5 $\mu$m (0.1 to 20 mm when protection is made by the inorganic substrate itself)
organic protective layer: 10 nm to 10 mm
light reflection layer: 5 nm to 300 nm Each of the layers described above can be formed by selecting a suitable method from vacuum evaporation, evaporation inside gas, sputtering, ion beam evaporation, ion plating, electron beam evaporation, injection molding, casting, spin coating, and plasma polymerization.

The recording member in accordance with the present invention can be used not only in the disc form, but also in tape or other forms.

Hereinafter, the present invention will be described in further detail with reference to examples thereof.

EXAMPLE 1

A tracking groove replica was formed on the surface of a disc-like, chemically reinforced glass sheet having a diameter of 30 cm and a thickness of 1.2 mm using an ultraviolet-cured resin and cellulose acetate, and one track was divided into 64 sectors with the start of each sector having an engraved sector address, thereby providing a substrate 14. The substrate 14 was then disposed inside a vacuum evaporator having an internal construction such as shown in FIG. 1. Four evaporation boats 1 through 4 were arranged inside the evaporator. These boats were positioned on the circumference concentric with the center shaft 5 of the revolution of the substrate below the portions of the substrate at which data were to be recorded. Te, Se, Sn and $GeO_2$ were placed into these boats, respectively. Masks 6 through 9 each having a fan-like slit and shutters 10 through 13 were interposed between the boats and the substrate, respectively. While the substrate was being rotated at 120 rpm, a current was caused to flow through each boat to evaporate the material inside the boat. The evaporation quantities from the boats were detected by quartz crystal oscillator-type thickness monitors 15, 16, 17 and 18, respectively, and the current caused to flow through each boat was controlled so that the evaporation rate became constant.

Figure 2:
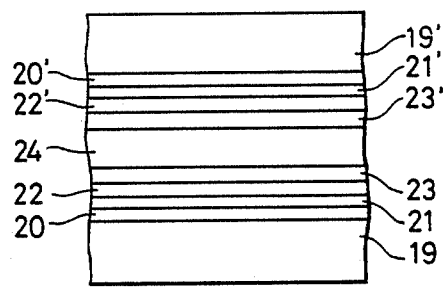
FIGS. 2 and 3 are sectional views showing the structure of the data recording members in the embodiments of the present invention, respectively.

As shown in FIG. 2, an about 80 nm-thick protective layer 20 having a composition comprised of $GeO_2$ was first formed on the substrate 19. Next, a recording film 21 having a composition consisting essentially of $Sn_{10}Te_{65}Se_{25}$ was evaporated in a thickness of about 50 nm. A protective layer 22 having a composition comprised of $GeO_2$ was again evaporated in a thickness of about 80 nm. Likewise, a protective layer 20' having a composition comprised of $GeO_2$, a recording film 21' having a composition consisting essentially of $Sn_{10}Te_{65}Se_{25}$ and a protective layer 22' having a composition comprised of $GeO_2$ were evaporated on another substrate 19' of the same size and material. Polystyrene layers 23 and 23' were then coated in a thickness of about 0.5 $\mu$m on the evaporation films of the resulting two substrates 19 and 19', respectively, and both substrates were bounded by an organic adhesive layer 24 with the polystyrene layers facing inward with each other, thereby forming a disc.

The light from a flash lamp was repeatedly radiated to the disc from both surfaces so as to sufficiently crystallize the $Sn_{10}Te_{65}Se_{25}$ recording films 21 and 21'. Recording was made in the following manner. While the disc was being rotated at 1,800 rpm, the light from a semiconductor laser (wavelength: 820 nm) was kept at a level at which recording was not made, was converged by a lens inside a recording head and was radiated to one of the recording films through the substrate. The head was driven by detecting the reflected light in such a fashion that the center of the groove for tracking was always in agreement with the center of the light spot. While tracking was thus conducted, automatic focusing was established so that the focus existed on the recording film, and recording was made by increasing or returning to the original level the laser power in accordance with the data signals. Jump recording to another groove was also made, whenever necessary. In the course of recording, the change of reflectivity, which presumably resulted from the change of the film to the amorphous state, occurred on the recording film. In this recording film, the recorded content could be erased by radiating laser light whose length in the track direction was greater than that of the recording light spot and whose length in the direction to the adjacent tracks was close to that of the recording light spot.

If the distance between most adjacent pits, that represents the address, was from ½ to up to 2 times the length of the erasing light spot in the track direction track and sector address can be read also by the erasing light spot, and the pit length representing the address is preferably at least ½ times the length of the erasing light spot in the track direction. This also held true of the other pits disposed at a header portion.

Read of data was conducted in the following manner. While the disc was being rotated at 1,800 rpm and tracking as well as automatic focusing were being effected in the same way as in the recording mode, the intensity of the reflected light was detected by such laser power than did not generate recording and erasing, thereby reproducing the data. This embodiment provided an error rate of about $1 \times 16^{-6}$. In the course of life test at 60° C. and a humidity of 95% for 6 months, the error rate increased to $2 \times 10^{-6}$, but this rendered no problem in practice.

When the composition was changed in the $Sn_xTe_ySe_z$ recording film, the error rate after life test at 60° C. and a relative humidity of 95% for 6 months was as follows. Here, x representing the atomic percent of Sn was 10 (x=10), z representing the atomic percent was varied with the following results of Se:

$z=0: \sim 5 \times 10^{-5}$, $z=5: \sim 2 \times 10^{-6}$, $z=45: \sim 1 \times 10^{-5}$, $z=3: \sim 1 \times 10^{-5}$ $z=35: \sim 2 \times 10^{-6}$ $z=60: \sim 5 \times 10^{-5}$ The error rate became greater with the smaller z value because of oxidation, while the error rate became greater with the greater z value because of crystallization of the recorded points or pits.

When x was changed with z being kept at a constant value 25, the change from the crystal state to the amorphous state became difficult when x exceeded 40. When x was below 2, the error rate did not reach the order of $10^{-6}$ because the crystal size was great and noise occurred. Moreover, the stability under the amorphous state was low. When x was greater than 5, the error rate was below $2 \times 10^{-6}$. Within the range in which x was not more than 25 and z was not more than 35, crystallization temperature became high and stability was improved if either one, or both, of x and z became great.

The Sn-Te-Se system recording film must be at least 3 nm thick in order to obtain sufficient stability and necessary contrast for data reading. Unless the film is below 300 nm thick, the sensitivity will drop due to heat conduction. Therefore, a preferred range of thickness is from 30 nm to 150 nm. The $GeO_2$ protective layer must be at least 1 nm thick in order to obtain its effect, but is preferably up to 5 μm thick in order to prevent the occurrence of cracks, and the like. If the thickness is from 20 nm to 200 nm, the film can withstand the storage under a severe conditions. The organic layer outside the $GeO_2$ layer must be at least 10 nm thick in order to exhibit its effect, and particularly preferably, at least 10 m thick. Moreover, it must be up to 10 mm thick so that the light can be converged by the lens. If the $Al_2O_3$ layer is used in place of the $GeO_2$ layer, the film formation becomes difficult, but a high protective effect can be obtained when rewriting the data. Next preferred is the $SiO_2$ layer.

The oxidation resistance of the Sn-Te-Se system recording film can be increased and its crystallization during storage can be prevented by forming a region, in which the content of at least one of Sn and Se is increased, at least one of the portions near the interface between the film and the protective layer having a composition comprising $GeO_2$ on the substrate side and the portion near the interface between the film and the protective layer having a composition comprising $GeO_2$ on the side opposite to the substrate, by changing the open angle of each shutter during vacuum evaporation of the film.

At least one member selected from the group consisting of In, As, Bi, S, Si, Ge, Pb, Al, Ga, Sb, Tl, Zn, Cd, Au, Ag, Cu, Ni, Pd, Rh, Cr, Mo, W and Ta may be added in place of part of Sn or substituted for all of Sn, and the amount of addition of such a member is substantially the same as that of Sn. However, merits and demerits exist in accordance with the selected element. In the case of Ge and Si, for example, it is difficult to carry out deposition by vacuum evaporation with high reproducibility. In the case of As, deposition by vacuum evaporation with high reproducibility is also difficult and in addition, toxicity is high and dust is likely to be produced during vacuum evaporation. The stability is low for addition of Bi in the amorphous state. In, Ga, Tl, Zn, Cd, Pb and As are easily oxidizable. Vacuum evaporation of S is difficult. Sb provides high toxicity when oxidized. Au and other metal elements involve the problem that they increase the heat transfer coefficient and reduce the sensitivity. However, In, Sb, As, Ge and Si help stabilize the amorphous state. The advantage of In over Sn is that vacuum deposition is easier. In and Sb may replace the full amount of Sn keeping the high performance of the recording film.

It is possible to use, in place of at least one of the $GeO_2$ protective layers, a layer whose principal or major component is at least one member selected from the group consisting of $CeO_2$, $La_2O_3$, SiO, $In_2O_3$, $Al_2O_3$, GeO, $GeO_2$, PbO, SnO, $SnO_2$, $TeO_2$, $WO_2$, $WO_3$, CdS, ZnS, CdSe, ZnSe, $In_2S_3$, $In_2Se_3$, $Sb_2S_3$, $Sb_2Se_3$, $Ga_2S_3$, $Ga_2Se_3$, $MgF_2$, $CeF_3$, $GaF_2$, GeS, GeSe, $GeSe_2$, SnS, SnSe, PbS, PbSe, $Bi_2Se_3$, $Bi_2S_3$, TaN and C, besides $Al_2O_3$ and $SiO_2$ heretofore described. However, if an opaque layer consisting of carbon or the like is disposed on the light incident side, the film thickness must be reduced. It will be appreciated that with a disc-shape substrate having a diameter of 30 cm, a recording film will have a radius in a range of from 6 to 14.5 cm and the radius of the protective layer or film is the same or larger than that of the secondary film. The radius of a polystyrene layer is the same or larger than that of the protective layer.

EXAMPLE 2

The substrate used was an acrylic resin sheet having on the surface thereof a groove for tracking formed by injection molding. A $GeO_2$ film and a recording film were deposited by vacuum deposition on the substrate in the same way as in Example 1. After an about 80 nm thick $Sn_{10}Te_{65}Se_{25}$ recording film was formed, the substrate was once taken out from the vacuum chamber, and ultraviolet rays were irradiated at 25° C. and a humidity of 80% to oxidize the film. Oxidation took place more vigorously, of course, at the surface, at which the contents of Sn and Se decreased. However, the interior part of the film was also oxidized, and the average composition in the direction of film thickness was substantially $Sn_9Te_{59}Se_{22}O_{10}$. Te of the surface was oxidized and the Te ions at portions close to the surface moved to the surface and were oxidized. At the under part of the surface, Se and Sn were retained. Subsequently, the substrate was again placed into the vacuum evaporator, and an about 80 nm thick film having a composition comprising $GeO_2$ was deposited by vacuum evaporation on the recording film. Similarly, another substrate was produced, and an about 0.5 μm thick acrylic resin was coated on each evaporation film having a composition comprising $GeO_2$. Thereafter, both substrates were bonded to each other by an organic adhesive with the acrylic resin layers facing inward with each other, thereby forming a disc.

The methods of crystallization, recording, erasing and reading were substantially the same as those of Example 1.

Introduction of oxygen into the recording film may be effected by using Te oxide in place of Te as the evaporation source, but reproducibility of vacuum evaporation is low and control becomes difficult.

When the average composition of the recording film is expressed by the general formula $Sn_xTe_ySe_zO_\alpha$, the preferred ranges of x and z are substantially the same as those of Example 1. However, experiments were carried out while keeping α fixed at about 10. The preferred range of α is up to 20 atomic %, and if α is from 20 to 35 atomic %, wrinkles and cracks, which might result from the increase in the internal stress of the film, are more likely to occur. However, the recording, reproducing and erasing characteristics remain at usable levels. If the oxygen content exceeds 35 atomic %, the sensitivity drops remarkably.

At least one of the other elements such as Sb can be added in place of a part of or all of Sn, and the $Al_2O_3$ layer can be used in place of the $GeO_2$ layer, in the same way as in Example 1.

The preferred thickness of each film is the same as that of Example 1.

The recording member obtained by this example had long life in the same way as that of Example 1.

EXAMPLE 3

Figure 3:
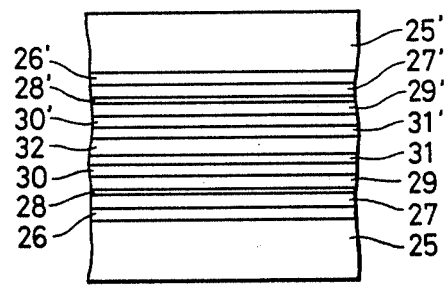

A $GeO_2$ layer 26 and an about 40 nm-thick $Sn_{10}Te_{65}Se_{25}$ film 26 were formed on a substrate 25 similar to the substrate of Example 2, in the same way as in Example 2 as shown in FIG. 3. After these films were oxidized to an Sn-Te-Se-O film 27, a $GeO_2$ film 28 was about 10 nm thick, and an about 30 nm thick layer 29 having a composition close to $Bi_2Te_3$ was formed on the film 28. Furthermore, an about 80 nm-thick $GeO_2$ layer 30 was deposited by vacuum deposition on the layer 29. Film formation until this stage was conducted by vacuum evaporation. One other substrate was formed in the same way as described above. After about 50 μm-thick ultraviolet light cured resin layers 31, 31' were coated on the uppermost $GeO_2$ layers 30, 30' of both substrates, respectively, both substrates were bonded to each other using a pressure sensitive adhesive 32 with the UV-cured resin layers facing inward with each other, thereby forming a disc.

The methods of crystallization, recording, erasing and reading were substantially the same as those of Example 1. In the recording film of this example, the Sn and Se contents dropped near the interface of the film with the $GeO_2$ layer due to selective oxidation of Te.

In this example, light absorption by the Sn-Te-Se-O layer is less, so that the recording light are greatly absorbed by the $Bi_2Te_3$ layer, and the resulting heat is transmitted to the Sn-Te-Se-O film. The intermediate $GeO_2$ layer between the Sn-Te-Se-O film and the $Bi_2Te_3$ layer was disposed in order to prevent their mutual diffusion when write and read of data are repeatedly made. Therefore, if this layer is excessively thick, the heat transfer efficiency from the $Bi_2Te_3$ layer to the Sn-Te-Se-O film, and hence recording sensitivity, will drop.

In order to obtain practical recording sensitivity, the $GeO_2$ layer is preferably up to 50 nm thick. This also holds true when $Al_2O_3$, $SiO_2$ or other transparent material is used in place of this layer. It is also possible to use a layer whose principal component is $CeO_2$ or the like, in place of $GeO_2$ layer in the same way as in Example 1. In this example, it is further possible to use a film, in which absorption of the semiconductor laser light hardly occurs, but recording by means of phase transition is possible, such as a film consisting of $Sb_2Se_3$ as the principal component, in place of the Sn-Te-Se-O film. It is naturally possible to use those Sn-Te-Se-O or Sn-Te-Se films whose Sn is substituted by at least one other element such as In, or a recording film whose principal component is a Ge-Te-Se system material, in the same way as in Example 1.

In order to exhibit the light reflection and light absorption effects, the $Bi_2Te_3$ layer must be at least 5 nm thick. It must be up to 300 nm in order to reduce the drop of sensitivity due to heat conduction. The preferred thickness of the other layers is the same as that of Example 1.

A variety of semiconductors, semi-metals, metals, and their mixtures and compounds such as Bi, Te, Sn, Sb, Al, Au, Pd, and the like, can be used in place of $Bi_2Te_3$.

EXAMPLE 4

An about 4 μm-thick polystyrene layer was formed by spin coating on an aluminum alloy disc having a diameter of about 35.5 cm. Next, a laminated film of $GeO_2/Sn_{10}Te_{65}Se_{25}/GeO_2$ was formed on the polystyrene layer in the same way as in Example 1, and an about 200 μm-thick fluorocarbon plasma polymerized film was further formed on the laminated film. In this disc, the light for recording, reproduction and erasing was incident from the side opposite to the aluminum alloy sheet.

The preferred range of the content of each element is the same as that of Example 1. A part or all of Sn may be substituted by at least one other element such as In, and $CeO_2$, or the like, may be used in place of $GeO_2$, in the same way as in Example 1. A reflection layer such as described in Example 3 may be interposed between the $GeO_2$ layer on the substrate side and the Sn-Te-Se film. In this case, it is more preferable to dispose an intermediate layer such as described in Example 3 between the reflection layer and the recording layer.

The preferred thickness of each layer is the same as that of Example 1.

As described above, the present invention can provide a recording member having high reproducibility and high stability for an extended period of time by a simple production process. Rewrite of data can also be made.

What is claimed:

1. A method of recording and reproducing information comprising the steps of: (1) providing an information recording film having an average composition, in a direction of the film thickness, expressed by the following formula:

$$M_xTe_ySe_zO_\alpha$$

wherein x, y, z and α are values within the ranges of $2 \leq x \leq 40$, $30 \leq y \leq 95$, $3 \leq z \leq 45$ and $0 \leq \alpha \leq 20$, and M is at least one element selected from the group consisting of As, Sb, Bi, S, Si, Ge, Sn, Pb, Al, Ga, In, Tl, Zn, Cd, Au, Ag, Cu, Ni, Pd, Rh, Cr, Mo, W and Ta, which is formed on a substrate, (2) irradiating a recording beam to said information recording film to cause a phase transition of said information recording film, said phase transition being a transition between the amorphous and crystalline phases, and (3) detecting the condition of said phase transition of said information recording film.

2. A method as defined in claim 1, wherein the recording beam is a laser beam.

3. A method as defined in claim 1, wherein the elements expressed by M in said general formula include at least Sn.

4. A method as defined in claim 1, wherein the elements expressed by M in said general formula include at least In.

5. A method as defined in claim 1, wherein the elements expressed by M in said general formula include at least Sb.

6. A method as defined in claim 1, wherein M is a combination of two elements, said combination of two elements being selected from the group consisting of In and Sb, Sn and Ge, Pb and Sn, Sn and Bi, Sn and S, In and Pb, In and Bi, Sb and Bi, Sb and S, Sb and Pb, Sb and Sn, Sb and Ge, As and Sn, and As and Sb.

7. A method as defined in claim 6, wherein M is a combination of two elements, said combination of two elements being selected from the group consisting of Sn and Ge, Pb and Sn, Sn and Bi, Sn and S, Sb and Sn and As and Sn.

* * * * *